United States Patent [19]

Camilleri

[11] Patent Number: 4,989,817
[45] Date of Patent: Feb. 5, 1991

[54] WALL BRACKET

[75] Inventor: Charles F. Camilleri, St. Louis, Mo.

[73] Assignee: Lee-Rowan Company, St. Louis, Mo.

[21] Appl. No.: 815,650

[22] Filed: Jan. 2, 1986

[51] Int. Cl.⁵ .............................................. F16B 13/00
[52] U.S. Cl. ................................ 248/231.91; 248/235
[58] Field of Search ............... 248/231.9, 231.91, 235, 248/247, 248, 138 A, 340-346, 57, 60, 45, 71

[56] References Cited

U.S. PATENT DOCUMENTS

| | | | |
|---|---|---|---|
| 2,302,590 | 11/1942 | Waite | 411/57 |
| 3,198,058 | 8/1965 | Barry | 411/57 |
| 3,241,797 | 3/1966 | Anderson | 248/74.5 |
| 3,606,814 | 9/1971 | MacKenzie | 411/60 |
| 3,637,183 | 1/1972 | Sagers | 248/235 |
| 4,022,100 | 5/1977 | Johnson | 411/57 |

FOREIGN PATENT DOCUMENTS

| | | | |
|---|---|---|---|
| 1292946 | 4/1969 | Fed. Rep. of Germany | 411/60 |
| 819041 | 6/1937 | France | 411/60 |
| 46-16210 | 5/1971 | Japan | 411/57 |
| 241600 | 9/1946 | Switzerland | 411/60 |
| 855285 | 11/1960 | United Kingdom | 411/60 |
| 1166262 | 10/1969 | United Kingdom | 411/60 |

*Primary Examiner*—David M. Purol
*Assistant Examiner*—Robert A. Olson
*Attorney, Agent, or Firm*—Rogers, Howell & Haferkamp

[57] ABSTRACT

A wall bracket to support the side of a shelf. A cradle extending from a back plate and a pair of wall anchors formed integrally with the back plate. Laterally expandable fingers on the wall anchors. Drive pins for being driven through the sockets to expand the fingers. Reinforcing ribs on the front of the back plate to strengthen the sockets against strain of the drive pins.

9 Claims, 1 Drawing Sheet

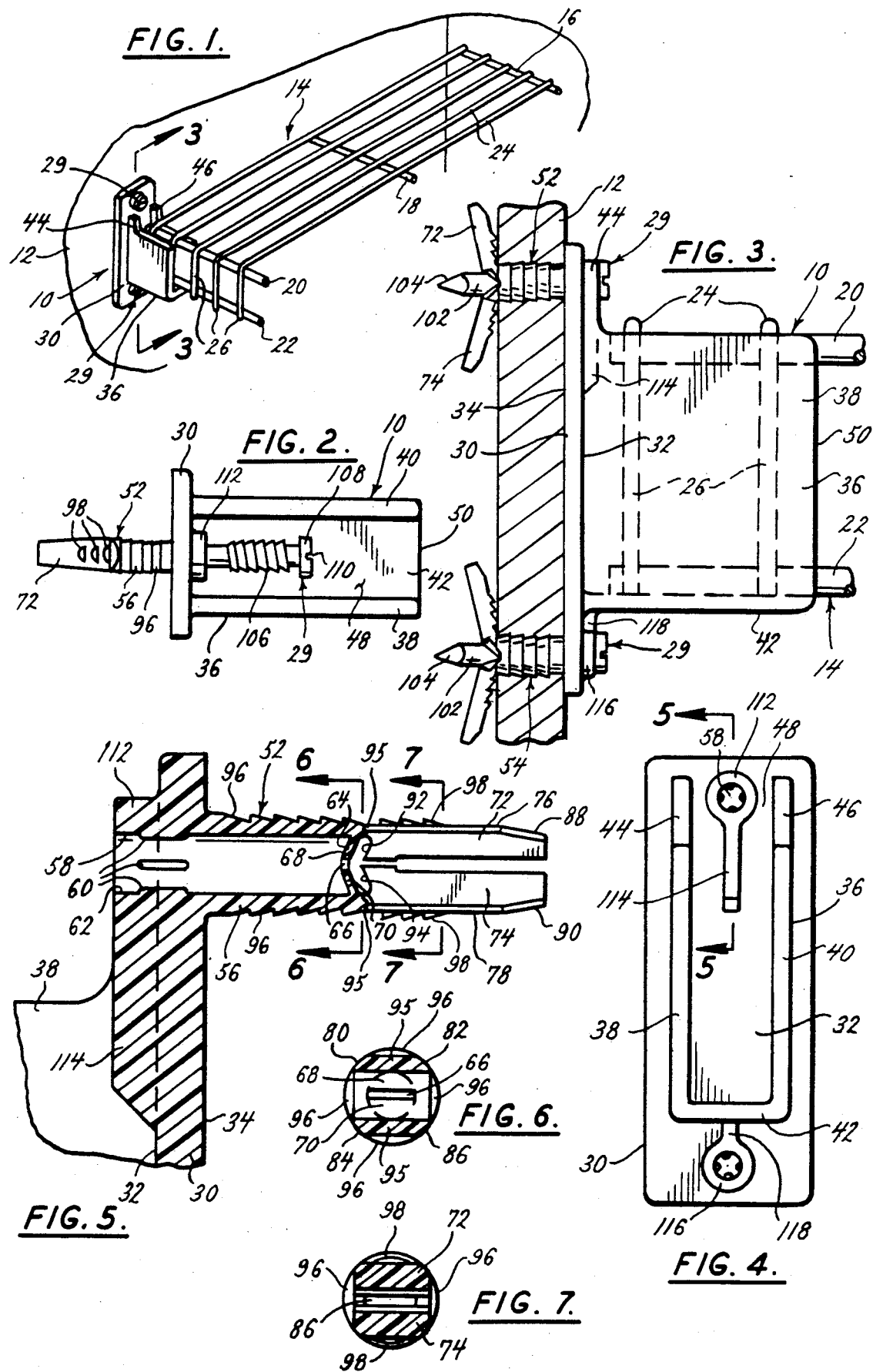

WALL BRACKET

BACKGROUND AND SUMMARY OF THE INVENTION

This invention relates to a wall bracket of the kind adapted to support a front edge of a shelf from a wall. More particularly, the invention is directed to a wall bracket having integral wall anchors molded to it to provide a unitary overall construction.

In the prior art there is an abundance of wall brackets, including wall brackets adapted to support shelves. There are also means to attach wall brackets to a wall. The wall brackets of the prior art include a wall bracket having a cradle joined to a back plate with holes through the back plate to receive screws or other mounting means. Among the mounting means available are a variety of wall anchors that include fingers expandable laterally upon the insertion of a screw-like member. However, these prior art devices do not have the advantages of the unitary wall bracket of this invention.

SUMMARY OF THE INVENTION

This wall bracket comprises a cradle extending from a back plate and having wall anchors, preferably two in number, extending from the back plate, all molded together as a unitary part. The cradle section has a bottom wall and side walls with an open end and an open top to receive the vertical front edge of a shelf. Each wall anchor has a socket with two fingers extending from it. A drive pin is gripped within the socket in a ready condition and, when driven further into the socket by a hammer, the drive pin engages transverse walls on the fingers, expanding the fingers laterally to lock the wall bracket to a wall.

The transverse walls on the fingers are inclined inwardly and toward the back plate so that when these walls are engaged by the drive pin and the fingers are pivoted outwardly, the transverse walls will have edges bearing against the drive pin to keep the fingers further toward ninety-degree positions relative to the axis of the socket. This provides a better grip against the wall.

The fingers are connected to the body portion of the socket by short thin plastic walls that act as hinges. To avoid the formation of stress lines during the molding process which would otherwise occur when a molding core intersects these transverse walls, there is a thin web extending inwardly and slightly spaced from the transverse walls. The thin web has a transverse slit that separates the web into halves. This web locates the aforesaid stress lines at the juncture between the passage and the web rather than at the juncture between the passage and the transverse walls of the fingers. Therefore, if the stress lines do cause a failure, it is a failure at the web rather than where the fingers are joined to the socket.

Another advantage of the web is that it is first engaged by the drive pin which thereafter presses the web halves against the transverse walls of the fingers. The web is split by the drive pin to ride against its surface, and the edges of the web defined by the slit are positioned against the transverse walls. These edges provide stops to oppose sliding of the transverse walls along the drive pin, which would allow the fingers to collapse somewhat.

The outer surface of the body section of each socket has a plurality of rings having a sawtooth configuration. These rings allow the ready insertion of the wall anchor into a predrilled hole of proper diameter, but the sawtooth configuration of the rings tends to hold the wall anchor in place to temporarily support the wall bracket until it is anchored. This makes driving of the drive pins easier.

The drive pin has a special configuration. It has a front shank portion that is generally cylindrical in shape with a lead end that may have a blunt point around its nose. Trailing the cylindrical shank section is a threaded section. The threads are preferably of sawtooth configuration allowing the pin to be readily driven into the passage of the socket and allowing the pin to be withdrawn by rotation by a screwdriver. The head of the drive pin may be provided with a kerf or phillips head slot for either of the two common types of screwdrivers.

The installation of the wall bracket can be done by positioning the wall anchors in holes in a wall, steadying the wall bracket with one hand (if necessary) and, with the other hand, holding a hammer that drives the drive pin. It is thus not necessary to first install a wall anchor socket, then attempt to hold the wall bracket, hold a screw and hold a hammer or more customarily a screwdriver to force the screw into the wall anchor socket. It is also much less expensive to provide the unitary composition of the present invention with all parts molded together as a unitary part.

In the molding of the wall anchor portion, the fingers are positioned together extending in line with the body section of the socket. Therefore, to insert the wall anchor portion into a predrilled hole in the wall, it is not necessary to squeeze the fingers together. This is a particular advantage since there are two wall members.

BRIEF DESCRIPTION OF THE DRAWINGS

FIG. 1 is an isometric view showing the wall bracket mounted against the side wall and supporting one end of the front of a shelf;

FIG. 2 is an enlarged top plan view of the wall bracket with the anchor fingers extended and the drive pin positioned in a position;

FIG. 3 is an enlarged side elevation view of the wall bracket as mounted in a wall and as viewed along the plane of the line 3—3 of FIG. 1;

FIG. 4 is a further enlarged front elevation view of the wall but with the drive pins removed;

FIG. 5 is a further enlarged partial view in section taken the plane of the line 5—5 of FIG. 4;

FIG. 6 is a view in section taken along the plane of the line 6—6 of FIG. 5; and FIG. 7 is a view in section taken along the plane of the 7—7 of FIG. 5.

DETAILED DESCRIPTION OF THE INVENTION

As shown in FIG. 1, this wall bracket 10 is adapted to be mounted against a side wall 12 and to support one side of the front of a conventional shelf 14. The shelf 14 is of the kind that has several parallel support rods, including a rear rod 16, an intermediate rod 18, and upper and lower front rods 20 and 22. The support rods support a plurality of spaced cross rods 24 that have front sections 26 bent downwardly past the front rods 20 and 22. The cross rods 24 are welded or otherwise secured to the support rods 16, 18, 20 and 22. It will be understood that the shelf 14 is supported to a back wall 28 such as by back wall clips.

As shown particularly in FIGS. 2, 3 and 4, the wall bracket 10 comprises a single unitary component formed of molded plastic. The only separate parts are two identical drive pins 29 which will be described hereinafter.

The wall bracket 10 includes a back plate 30 having front and rear faces 32 and 34. A cradle 36 defined by side walls 38 and 40 and a bottom wall 42 is formed integrally with the back wall 30 and extends from the front face 32 thereof. Because the typical shelf 14 has extensions of the rods 20 and 22 beyond the most extreme cross rod 24, the side walls 38 and 40 can have upwardly extending rear sections 44 and 46 to maximize the length of juncture between the cradle 36 and the back plate 30, particularly at the upper portions thereof, and thereby increase the load-supporting capacity of the wall bracket 10. As shown, the cradle 36 is open at its top 48 and its front end 50.

As can be seen in the drawings, the back plate 30 extends above and below the cradle 36, and from these extended areas, there are upper and lower rearwardly extending wall anchors 52 and 54. The wall anchors 52 and 54 are identical and the following description of the wall anchor 52 applies to both.

As shown in FIGS. 2 and 5, the wall anchor 52 comprises a socket 56 that cooperates with one of the drive pins 29. The socket 56 has a passage 58 through it with inwardly projecting longitudinal ribs 60 adjacent to the mouth 62 of the passage. The passage terminates at a thin plastic web 64 having a transverse slit 66 across it that divides the web into two halves 68 and 70. Just beyond the web 64, there are two fingers 72 and 74, the outer surfaces 76 and 78 of which are shaped to lie within a projection of the socket 56 when the fingers are together as shown in FIG. 5. To help, there may be beveled edges 80, 82, 84 and 86. The noses 88 and 90 may be tapered and have beveled edges to facilitate entry into a hole in a wall.

The fingers have transverse walls 92 and 94 that are in the path of the passage 58. The walls 92 and 94 are inclined inwardly as well as toward the mouth 62 of the passage 58. As clearly shown in FIG. 5, the web halves 68 and 70 tend to lie parallel to the walls 92 and 94. Whereas the juncture between the passage 58 and the web 64 may be sharp with stress lines created by the intersection of the core that forms the passage 58 with the web 64, the web 64 allows the juncture between the web and the fingers 72 and 74 to be rounded smooth, thereby eliminating stress lines. This juncture is in the form of thin walls 92 and 94 that function as hinges allowing the fingers to swing from the extended positions shown in FIG. 5 to the spread positions shown in FIG. 3. This spreading occurs when the drive pin 29 is driven from the ready position shown in FIG. 2 into the driven position shown in FIG. 3.

The outer surface of the socket 56 has a plurality of rings 96 along its length. The rings 96 are in a sawtooth configuration that allows the socket 56 to slide into a hole in the wall but that resists removal of the socket. Likewise, there are a plurality of ribs 98 on the fingers 88 and 90. These ribs 98 help the fingers grip the wall when they have been spread against its surface. The drive pins 29 are also identical. Each includes a leading shank 102 having a front and formed as a point 104, or it may be blunt or rounded.

Behind the cylindrical portion 102 of the shank, the pin has a plurality of double helix threads 106, as shown in FIG. 2. (The threads 106 are sawtooth in configuration to allow the pin to be driven into the passage 58 and to be withdrawn by rotation in the opposite direction to the direction of threading. A head 108 on the end of the pin facilitates its being driven by a hammer into the passage 58. A slot 110 in the head 108 for a conventional or Philips type screwdriver facilitates withdrawal of the pin 29 upon rotation.

Driving the pins 29 into the sockets creates a strain between the wall anchor 52 and the back plate 30. Also, when the shelf is in place and loaded, a bending moment and shear loads are created between the back plate and the wall anchors. To counteract the resulting stresses, there is a forwardly projecting ring 112 in the front of the back plate 30 surrounding the passage 58 to thicken that area. To provide further strength, particularly against the bending moment, a contiguous rib 114 extends downwardly from the ring 112. Similarly, a ring 116 surrounds the passage for the lower wall anchor 54, and a contiguous rib 118 extends upwardly therefrom into juncture with the collar 36.

Operation and Use

When the wall bracket 10 is ready for use, the drive pins 29 will have been pressed into the ready positions (shown in FIG. 2) in the sockets 56. This leaves the fingers 72 and 74 extended as shown in FIGS. 2 and 5 so that they will slide into pre-drilled holes in the wall. Before the shelf 14 is mounted, the wall bracket is installed by first sliding both the wall anchors 52 and 54 into the vertically spaced holes in the wall 12. The sawtooth rings 96 will help hold the wall anchors 52 in the holes, thereby holding the wall bracket in position as it is being installed.

Next, a hammer can be used to drive the drive pins 29 into the sockets 56 until the heads 108 hit the annular rims 112 and 116. As the head 104 of each pin 29 engages the web 64, it enters the slit 66 and separates the halves 68 and 70, pressing them against the faces 92 and 94 of the fingers 72 and 74. Further extension of the pin drives its leading end 104 against these faces 92 and 94 (through the web 64) spreading the fingers 72 and 74. Because the faces 92 and 94 are inclined, the fingers tend to pivot further about their hinges 95 toward lateral extending positions, as shown in FIG. 3. The ribs 98 tend to grip the wall 12 and help hold the wall anchors 52 and 54 in place.

Now the shelf 14 can be installed. Suitable wall clips are used to attach the wire 16 to the wall 28. The side edge of the front end, including the rods 20 and 22 is set in the cradle 36, as shown in FIG. 1.

If it is desired to remove the wall bracket, the drive pins are rotated by a screwdriver. The threads 106 cause the pins 29 to be withdrawn, thereby allowing the fingers 72 and 74 to be straightened so that they can be withdrawn from the hole in the wall.

There are various changes and modifications which may be made to this invention as would be apparent to those skilled in the art. However, any of these changes or modifications are included in the teaching of this disclosure and this invention is limited only by the scope of the claims appended hereto.

What is claimed is:

1. A wall bracket attachable to a wall to support a shelf or the like comprising a support member for supporting the shelf or the like, a back plate integral with the support member, and a wall anchor assembly including a tubular wall anchor socket integral with and extending beyond the back plate to an end spaced from the back plate, a passage through the socket having an entrance adjacent the back plate for receiving a pin, a pair of fingers pivotally joined to said end of the socket, the fingers being biased for normally extending longitudinally from the socket while substantially occupying an area circumscribed by a projection of the socket, the fingers having walls extending across a projection of the passage, the wall anchor assembly further including a pin having a shank extending between a head and a point, means defined by the passage for gripping the shank adjacent the head for holding the pin at least partially within the passage while the wall bracket is installed and in readiness for being driven further into the socket, means projecting from the shank of the pin engageable with the socket for interfering with withdrawal of the pin while allowing the pin to be driven into the socket, the shank of the pin being longer than the socket enabling the pin to be drawn through the socket to extend beyond the passage and into engagement with the walls to pivot the fingers to laterally outwardly extending positions relative to the socket, whereby the integral support member, back plate, and socket and the means for gripping the shank combine to allow the wall bracket to hold the pin and be held by one human hand as it is located on a wall with the fingers and the socket projecting through a hole in the wall thereby freeing a second human hand for driving the pin into the socket to spread the fingers.

2. The wall bracket of claim 1 including a second wall anchor assembly substantially identical to the first wall anchor, the wall anchor assemblies being vertically spaced part.

3. The wall bracket of claim 1 wherein the support member comprises a cradle having a bottom wall and side walls extending upwardly from the bottom wall, the top and one end of the cradle being open, the end of the cradle opposite the one end being joined to the back plate.

4. A wall bracket attachable to a wall to support a shelf or the like comprising a support member for supporting the shelf or the like, a back plate integral with the support member, and a wall anchor assembly including a tubular wall anchor socket integral with and extending beyond the back plate to an end spaced from the back plate, a passage through the socket having an entrance adjacent to the back plate for receiving a pin, a pair of fingers pivotally joined to said end of the socket, the fingers being biased for normally extending longitudinally from the socket while substantially occupying an area circumscribed by a projection of the socket, the fingers having walls extending across a projection of the passage, the wall anchor assembly further including a pin having a shank extending between a head and a point, means defined by the passage for gripping the shank adjacent the head for holding the pin at least partially within the passage while the wall bracket is installed and in readiness for being driven further into the socket, means projecting from the shank of the pin engageable with the socket for interfering with withdrawal of the pin while allowing the pin to be driven into the socket, the shank of the pin being longer than the socket enabling the pin to be drawn through the socket to extend beyond the passage and into engagement with the walls to pivot the fingers to laterally outwardly extending positions relative to the socket, whereby the integral support member, back plate, and socket and the means for gripping the shank combine to allow the wall bracket to hold the pin and be held by one human hand as it is located on a wall with the fingers and the socket projecting through a hole in the wall thereby freeing a second human hand for driving the pin into the socket to spread the fingers, the wall bracket further including a yieldable thin web in and transverse to the passage close to but spaced from the walls.

5. The wall bracket of claim 4 wherein the fingers are pivoted on generally parallel axes and the web has a slit in it separating the web into halves, the slit being generally parallel to the pivot axes of the fingers.

6. The wall bracket of claim 5 wherein the fingers are joined to the socket by short thin wall sections, the web being located between the socket and the fingers, the wall sections between the fingers and the web being substantially free of sharp corners.

7. The wall bracket of claim 5 wherein the walls of the fingers are inclined upwardly and toward the mouth of the socket.

8. The wall bracket of claim 7 wherein the web halves are generally parallel to the respective walls.

9. A wall bracket comprising a back plate having first and second parallel faces, a cradle extending normal to the first face and defined by a generally U-shaped member having an open top and opposite ends, one end of the cradle being integral with and closed by the back plate, the other end of the cradle being open, a pair of sockets integral with the back plate and extending perpendicular from the second face thereof, a pair of fingers pivotally joined to each socket and normally being biased together to lie entirely within a projected cylinder circumscribed about the outermost projections of the socket, a passage through each socket for receiving a pin, and a pin extendable through each socket to engage and pivot the fingers laterally outwardly, a web integral with each socket and extending inwardly of the passage, a slit in the web to receive the pin and split the web into two sections on opposite sides of the pin when the pin projects through the slit, the fingers having walls projecting across the passage, the web being between the walls and the socket.

* * * * *